United States Patent
Dadkhahi et al.

(10) Patent No.: US 12,124,965 B2
(45) Date of Patent: Oct. 22, 2024

(54) COMBINATORIAL BLACK BOX OPTIMIZATION WITH EXPERT ADVICE

(71) Applicant: International Business Machines Corporation, Armonk, NY (US)

(72) Inventors: Hamid Dadkhahi, White Plains, NY (US); Karthikeyan Shanmugam, Elmsford, NY (US); Jesus Maria Rios Aliaga, Philadelphia, PA (US); Payel Das, Yorktown Heights, NY (US); Samuel Chung Hoffman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 17/114,408

(22) Filed: Dec. 7, 2020

(65) Prior Publication Data
US 2022/0180212 A1 Jun. 9, 2022

(51) Int. Cl.
*G06N 5/01* (2023.01)
*G06N 3/126* (2023.01)

(52) U.S. Cl.
CPC ............... *G06N 5/01* (2023.01); *G06N 3/126* (2013.01)

(58) Field of Classification Search
CPC ............ G06N 5/01; G06N 3/08; G06N 3/086; G06N 3/092; G06N 3/096; G06N 3/126; G06N 7/01
See application file for complete search history.

(56) References Cited

U.S. PATENT DOCUMENTS

| 7,672,516 B2 | 3/2010 | Cremers |
| 2009/0319465 A1 | 12/2009 | Ignacio |
| 2019/0228377 A1 | 7/2019 | Pande |

FOREIGN PATENT DOCUMENTS

| GB | 2481087 A | * | 12/2011 | ............... G06N 5/01 |
| WO | WO 2018222203 A1 | * | 12/2018 | ............... G06N 5/01 |

OTHER PUBLICATIONS

Bagheri, Samineh, Wolfgang Konen, Michael Emmerich, and Thomas Bäck. "Solving the G-problems in less than 500 iterations: Improved efficient constrained optimization by surrogate modeling and adaptive parameter control." arXiv preprint arXiv:1512.09251 (2015). (Year: 2015).*

(Continued)

*Primary Examiner* — Michael J Huntley
*Assistant Examiner* — Imad Kassim
(74) *Attorney, Agent, or Firm* — Robert D. Bean

(57) ABSTRACT

Aspects of the present invention disclose a method, computer program product, and system for optimizing a result for a combinatorial optimization problem. The method includes one or more processors receiving a black-box model. The method further includes one or more processors learning a multilinear polynomial surrogate model employing an exponential weight update rule. The method further includes one or more processors optimizing the learnt multilinear polynomial surrogate model. The method further includes one or more processors applying the black-box model to the optimized solution found by the multilinear polynomial surrogate model. In an additional aspect, the method of learning an optimized multilinear polynomial surrogate model employing an exponential weight update rule further includes one or more processors calculating utilizing data from the black-box model, an update of the coefficients of the multilinear polynomial surrogate model.

18 Claims, 6 Drawing Sheets

(56) References Cited

OTHER PUBLICATIONS

Yang et al.("Learning Black-Box Attackers with Transferable Priors and Query Feedback", 34th Conference on Neural Information Processing Systems (NeurIPS 2020)) (Year: 2020).*
Bischl et al. ("mlrMBO: A Modular Framework for Model-Based Optimization of Expensive Black-Box Functions", Preprint submitted to Computational Statistics & Data Analysis Dec. 4, 2018) (Year: 2018).*
Bagheri al. ("Online Selection of Surrogate Models for Constrained Black-Box Optimization", 2016 IEEE Symposium Series on Computational Intelligence (SSCI), Athens, Greece, 2016, pp. 1-8) (Year: 2016).*
Bhagoji et al. ("Practical Black-box Attacks on Deep Neural Networks using Efficient Query Mechanisms", European Conference on Computer Vision (ECCV), 2018, pp. 154-169) (Year: 2018).*
Baptista et al., "Bayesian Optimization of Combinatorial Structures", 2018, In International Conference on Machine Learning (ICML), 15 pps, <https://arxiv.org/pdf/1806.08838.pdf>.
Dadkhahi et al., "Combinatorial Black-Box Optimization with Expert Advice", In Proceedings of the 26th ACM SIGKDD Conference on Knowledge Discovery and Data Mining (KDD '20), Aug. 23-27, 2020, Virtual Event, CA, USA, ACM, New York, NY, USA, 10 pps, <https://doi.org/10.1145/3394486.3403243>, Grace Period Disclosure.
Lepretre et al., "Combinatorial Surrogate-assisted Optimization for Bus Stops Spacing Problem", Conf. Ttl: Artificial Evolution, 14th International Conference, Evolution Artificielle, EA 2019, 2020, Publisher: Springer International Publishing, Country of Publication: Switzerland, ISBN: 9783030457143, Database: INSPEC, 3 pps.
Marti et al., "Black-box solvers in combinatorial optimizations", Conf. Ttl: 2015, International Conference on Industrial Engineering and Systems Management (IESM), 2015, Publisher: IEEE, Country of Publication: USA, ISBN: N/A, Database: INSPEC.
Oh et al., "Combinatorial Bayesian Optimization using the Graph Cartesian Product", 2019, In Advances in Neural Information Processing Systems 32 (NeurIPS), 23 pps., <https://arxiv.org/abs/1902.00448>.
Voutchkov et al., "Weld Sequence Optimization: The use of surrogate models for solving sequential combinatorial problems", Publ. Ttl: Computer Methods In Applied Mechanics And Engineering, vol. 194, No. 30-33, pp. 3535-3551, 2005, Publisher: Elsevier Science SA, Country of Publication: Switzerland, ISSN: 0045-7825, Database: SciSearch.
Wang et al., "Random forest-assisted evolutionary algorithm for data- driven constrained multiobjective combinatorial optimization of trauma systems", Publ. Ttl: IEEE Transactions on Cybernetics, vol. 50, No. 2, pp. 536-549, 2019, Publisher: IEEE, Country of Publication: USA, ISSN: 2168-2267, Database: INSPEC.

* cited by examiner

---

Algorithm 1 Combinatorial Optimization with Monomial Experts

1: Inputs: sparsity $\lambda$, maximum monomial order $m$
2: $t = 0$
3: $\forall \gamma \in \{-, +\}$ and $\forall i \in [p] : \alpha_{i,\gamma}^t = \frac{1}{2p}$
4: repeat
5:     $x_t \sim \hat{f}\alpha^t$ via Algorithm 2
6:     Observe $f(x_t)$
7:     $\hat{f}\alpha^t(x) \leftarrow \sum i \in [p] \, (\alpha_{i,+}^t - \alpha_{i,-}^t) \, \psi_i(x)$
8:     $\ell^{t+1} \leftarrow \hat{f}\alpha^t(x_t) - f(x_t)$
9:     for $i \in [p]$ and $\gamma \in \{-, +\}$ do
10:         $\ell_{i,}^{t+1} \leftarrow 2\lambda \, \ell^{t+1} \, \psi_i(x_t)$
11:         $\alpha_{i,\gamma}^{t+1} \leftarrow \alpha_{i,\gamma}^t \exp(-\gamma \, \eta_t \, \ell_{i,}^{t+1})$
12:         $\alpha_{i,\gamma}^{t+1} \leftarrow \lambda \cdot \dfrac{\alpha_{i,\gamma}^{t+1}}{\sum_{\mu \in \{-,+\}} \sum_{j \in [p]} \alpha_{j,\mu}^{t+1}}$
13:     end for
14:     $t \leftarrow t + 1$
15: until Stopping Criteria
16: return $\hat{x}* = \arg\min_{\{x_i: \forall i \in [t]\}} f(x_i)$

Algorithm 2 Simulated Annealing for Combinatorial Constraints

1: Inputs: surrogate model $\hat{f}\alpha_t$, neighborhood model $N$, constraint Set $C$
2: $t = 0$
3: Initialize $x_0 \in C$
4: repeat
5:     $z \sim \text{unif}(N(x_t))$
6:     if $\hat{f}\alpha_t(z) \leq \hat{f}\alpha_t(x_t)$ then
7:        $x_{t+1} \leftarrow z$
8:     else if $\text{unif}(0, 1) \leq \exp\left(-\dfrac{\hat{f}\alpha_t(z) - \hat{f}\alpha_t(x_t)}{s(t)}\right)$ then
9:        $x_{t+1} \leftarrow z$
10:    else
11:        $x_{t+1} \leftarrow x_t$
12:    end if
13:    $t \leftarrow t + 1$
14: until Stopping Criteria
15: return $x_t$

FIG. 4

Table 1: Average computation time per step (in seconds) over different datasets for different algorithms

| | BLACK BOX | | ALGORITHM | | |
|---|---|---|---|---|---|
| DATASET | d | COST | BOCS | COMBO | COMEX |
| N-QUEENS | 49 | 0.001 | 202.1 | 336.7 | 0.09 |
| CONTAMINATION | 21 | 0.001 | 28.6 | 53.8 | 0.07 |
| ISING | 24 | 2.24 | 47.7 | 78.4 | 0.10 |
| N-QUEENS | 144 | 0.001 | 401.28 | 722.05 | 2.87 |
| CONTAMINATION | 100 | 0.002 | 454.93 | 587.65 | 1.33 |
| DEFECT DYNAMICS | 400 | 73.16 | 873.99 | 3869.92 | 65.5 |

FIG. 5

COMBINATORIAL BLACK BOX OPTIMIZATION WITH EXPERT ADVICE

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) DADKHAHI et al., "Combinatorial Black-Box Optimization with Expert Advice", In Proceedings of the 26th ACM SIGKDD Conference on Knowledge Discovery and Data Mining (KDD '20), Aug. 23-27, 2020, Virtual Event, CA, USA. ACM, New York, NY, USA, 10 pps, <https://doi.org/10.1145/3394486.3403243>; and

BACKGROUND OF THE INVENTION

The present invention relates generally to the field of data analytics, and more particularly to modeling optimization.

Combinatorial optimization is a topic that consists of finding an optimal object from a finite set of objects. In many such problems, exhaustive search is not tractable. Combinatorial optimization operates on the domain of those optimization problems in which the set of feasible solutions is discrete or can be reduced to discrete, and in which the goal is to find the best solution. Typical problems are the travelling salesman problem ("TSP"), the minimum spanning tree problem ("MST"), and the knapsack problem.

In science, computing, and engineering, a black box is a device, system or object which can be viewed in terms of its inputs and outputs (or transfer characteristics), without any knowledge of its internal workings. The implementation is "opaque" (i.e., black). Almost anything might be referred to as a black box: a transistor, an engine, an algorithm, the human brain, an institution or government. In addition, to analyze something modeled as an open system, with a typical "black box approach", only the behavior of the stimulus/response will be accounted for, to infer the (unknown) box. The usual representation of this black box system is a data flow diagram centered in the box.

SUMMARY

Aspects of the present invention disclose a method, computer program product, and system for optimizing a result for a combinatorial optimization problem. The method includes one or more processors receiving a black-box model. The method further includes one or more processors learning a multilinear polynomial surrogate model employing an exponential weight update rule. The method further includes one or more processors optimizing the learnt multilinear polynomial surrogate model. The method further includes one or more processors applying the black-box model to the optimized solution found by the multilinear polynomial surrogate model. In an additional aspect, the method of learning an optimized multilinear polynomial surrogate model employing an exponential weight update rule further includes one or more processors calculating utilizing data from the black-box model, an update of the coefficients of the multilinear polynomial surrogate model.

BRIEF DESCRIPTION OF THE DRAWINGS

FIG. 3 is an example depiction of an algorithm, utilized in the processes of black box function optimization, in accordance with embodiments of the present invention.

FIG. 4 is an example depiction of an algorithm for simulated annealing, in accordance with embodiments of the present invention.

FIG. 5 is an example depiction of a table that depicts average computation time per step (in Seconds) over different datasets for different algorithms, in accordance with embodiments of the present invention.

DETAILED DESCRIPTION

Figure 1:
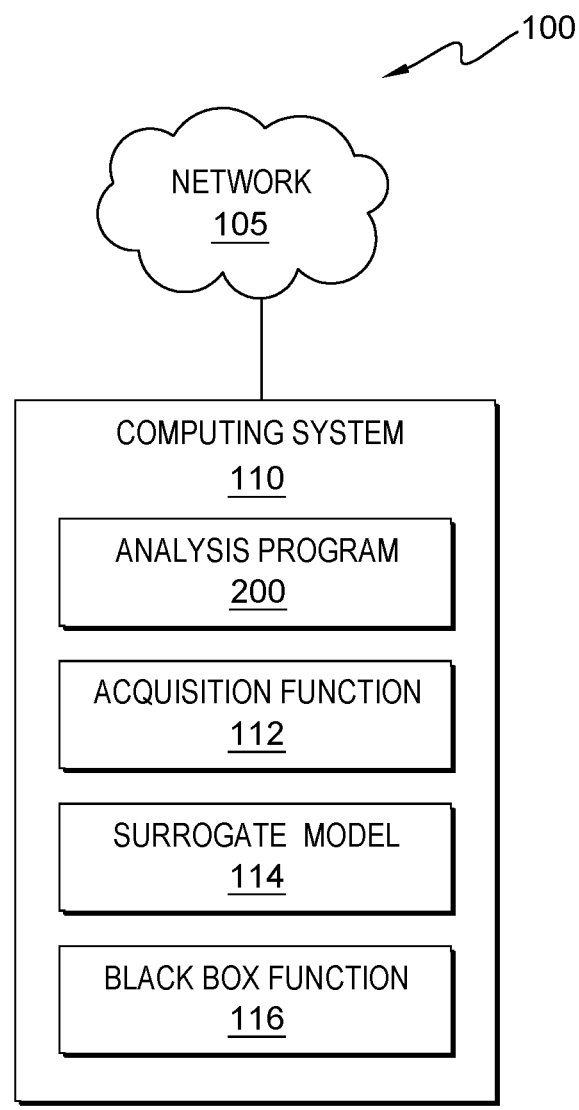
FIG. 1 is a functional block diagram of a data processing environment, in accordance with an embodiment of the present invention.

Embodiments of the present invention recognize the problem of black box function optimization over the Boolean hypercube. Despite the vast literature on black box function optimization over continuous domains, not much attention has been paid to learning models for optimization over combinatorial domains until recently. However, embodiments of the present invention recognize that the computational complexity of the recently devised algorithms are prohibitive even for moderate numbers of variables; drawing one sample using the existing algorithms is more expensive than a function evaluation for many black box functions of interest.

To address the problem, embodiments of the present invention can provide a computationally efficient model learning algorithm based on multilinear polynomials and exponential weight updates. Embodiments of the present invention provide a process that alternates between simulated annealing with respect to the current polynomial representation and updating the weights using monomial experts' advice. Numerical experiments on various datasets in both unconstrained and sum-constrained Boolean optimization indicate the competitive performance of the proposed process of the present invention, while improving the computational time up to several orders of magnitude compared to state-of-the-art algorithms in the literature.

Embodiments of the present invention recognize that combinatorial optimization (CO) problems arise in numerous application domains including machine learning, engineering, economics, transport, healthcare, and natural and social sciences. Broadly speaking, such CO problems involve optimizing an explicit function over a constraint set on a discrete domain. A number of important problems in this class are NP-hard (non-deterministic polynomial-time hardness) and there is a vast literature on approximating the problems in polynomial time. Embodiments of the present invention focus on black box combinatorial optimization, where embodiments of the present invention operate to minimize a function defined on the Boolean domain (a combinatorial domain) through acquiring noisy/perfect function evaluations from a black box oracle.

In addition, embodiments of the present invention recognize that a vast literature is available on black box function optimization when it comes to functions over the continuous domains. Bayesian Optimization (BO) is a well-established paradigm for optimizing costly-to-evaluate black box objective functions f with noisy evaluations. The latter paradigm consists of approximating f using a probabilistic function model, often called a surrogate model, and utilizing an acquisition function along with the surrogate model to draw samples. Some common acquisition functions are Expected Improvement, Probability of Improvement, Thompson Sampling and Upper Confidence Bounds.

Embodiments of the present invention also recognize that recently, generic black box optimization algorithms, such as Bayesian Optimization of Combinatorial Structures BOCS and Combinatorial Bayesian Optimization using the Graph Cartesian Product (COMBO), have been proposed for combinatorial domains. However, embodiments of the present invention recognize that learning the surrogate model followed by drawing a sample using either BOCS or COMBO, even for a moderate number of variables, is more expensive than an oracle evaluation for many black box functions of interest. For larger numbers of variables, it is essentially impractical to use BOCS and COMBO, as it takes a significant amount of time to determine the next sample to evaluate.

Accordingly, embodiments of the present invention operate to introduce an efficient black box optimization algorithm and corresponding process, that uses a multi-linear polynomial of bounded degree as the surrogate model and sequentially updates this model using exponential weight updates while treating each monomial as an expert. At each step, the acquisition function is a version of simulated annealing applied to the current multilinear polynomial representation given by the surrogate model. Numerical experiments on various datasets in both unconstrained and sum-constrained Boolean optimization problems indicate the competitive performance of the proposed algorithm, while improving the computational time up to several orders of magnitude compared to state-of-the-art algorithms in the literature.

Various embodiments of the present invention can provide a plurality of advantages. Embodiments of the present invention propose an implementation that utilizes a novel and computationally efficient algorithm for black box function optimization over the Boolean hypercube. Embodiments of the present invention implement a Combinatorial Optimization with Monomial Experts (COMEX) algorithm to operate to address the problem of black box function optimization over the Boolean hypercube, which comprises a pool of monomial experts forming an approximate multi-linear polynomial representation for the black box function. At any time-step, the coefficients of the monomial experts are refreshed via an exponential weight update rule.

In a further aspect, embodiments of the present invention provide a method that utilizes a version of simulated annealing applied to the current polynomial representation to produce new candidate points for black box function evaluations.

Embodiments of the present invention also operate to present theoretical insights on the sequential improvements in the proposed surrogate model as a result of exponential weight updates. Furthermore, embodiments of the present invention offer theoretical results proving that samples drawn under an exponential acquisition function model lead to sequential improvements in the surrogate model under some technical conditions.

In addition, embodiments of the present invention evaluate the performance of the COMEX algorithm, together with recently developed state-of-the-art BO methods for the combinatorial domain as well as popular heuristic-based baseline methods, on a variety of benchmark problems of different dimensionality. For example, the present disclosure investigates CO problems, which include sparsification of Ising models, noisy n-queens, food contamination control, and optimal arrangement of point defects in 2D nanomaterials.

Accordingly, embodiments of the present invention utilize the COMEX algorithm to perform competitively on all benchmark problems of low dimensionality, while improving the computational time up to several orders of magnitude. On problems of higher dimensionality, embodiments of the present invention utilize the COMEX to outperform all baseline and state-of-the-art BO methods in terms of finding a minimum within a finite time budget.

Embodiments of the present invention also recognize that the existing algorithms in discrete optimization literature, which are capable of handling black box functions, are not particularly sample efficient; in many applications, a large evaluation budget is required for such algorithms to converge to functions' optima. In addition, the existing algorithms are not necessarily guaranteed to find the global optima. The most popular algorithms in this category include local search and evolutionary search, such as particle search.

For Bayesian Optimization, embodiments of the present invention recognize that the majority of work on black box function optimization targets continuous domains. In particular, algorithms based on Bayesian Optimization have attracted a lot of attention in the literature. Many popular BO methods are built on top of Gaussian Processes (GPs), which rely on the smoothness defined by a kernel to model uncertainty. As such, the models are best suited for continuous spaces. The exceptions include the recently introduced algorithm BOCS and COMBO.

Regarding Hyperparameter Optimization, embodiments of the present invention recognize that Bayesian Optimization methods have been adapted to hyperparameter optimization. Here, one seeks to find the best hyperparameter configuration that minimizes the validation loss after training a model with that configuration. In this adaptation of BO methods, the goal is to select the next hyperparameter configuration given the function outputs in the previous iterations. However, in hyperparameter optimization, the focus is on the total training time and not the total number of noisy evaluations of hyperparameters. Therefore, bandit-based and tree search methods which focus on resource allocation have been developed. In our work, the main cost criterion is the number of function evaluations rather than other resources which can be controlled In addition, for Black Box Combinatorial Optimization, the BOCS algorithm employs a sparse monomial representation to model the interactions among different variables. However, the BOCS algorithm latter utilizes sparse Bayesian linear regression with a heavy-tailed horseshoe prior to learn the coefficients of the model, which is computationally costly. A Gibbs sampler is then used in order to draw a sample from the posterior over the monomial coefficients. When the monomials are restricted at the order of two, the problem of minimizing the acquisition function is posed as a second order program which is solved via semidefinite programming. Alternatively, simulated annealing is advocated for higher order monomial models or so as to speed up the computation for the case of order-two monomials.

More recently, the COMBO algorithm was introduced to address the impediments of BOCS. A one-subgraph-per-variable model is utilized for various combinatorial choices of the variables; the collection of such subgraphs is then joined via graph Cartesian product to construct a combinatorial graph to model different combinations of variables. The Graph Fourier Transform (GFT) over the formed combinatorial graph is used to gauge the smoothness of the black box function. A GP with a variant of the diffusion kernel, referred to as automatic relevance determination diffusion kernel, is proposed for which GFT can be carried out in a computationally tractable fashion. The proposed GP is capable of accounting for arbitrarily high orders of interactions among variables.

The computational complexity of surrogate-model learning in BOCS at time step t is in $\mathcal{O}(t^2 \cdot d^{2m})$, where d is the number of variables and m is the maximum monomial order in the model. This complexity is associated with the cost of sampling parameters from the posterior distribution. Hence, the complexity of BOCS grows quadratically in the number of evaluations, which particularly makes it unappealing for larger numbers of variables. On the other hand, despite the fact that the GFT utilized by COMBO is shown to be run in linear time with respect to the number of variables for the Boolean case, the overall computational complexity of the algorithm remains prohibitively high. More precisely, the overall computational complexity of learning the surrogate model in COMBO is in $\mathcal{O}(\max\{t^3, d^2\})$. The $\mathcal{O}(t^3)$ complexity is associated with marginal likelihood computation for the GP, whereas the $\mathcal{O}(d^2)$ term stems from the slice sampling utilized for fitting the parameters of the surrogate model. Therefore, both BOCS and COMBO incorporate model learning methods which grow polynomially in the number of function evaluations. This particularly hinders the applicability of the aforementioned algorithms for problems with moderate numbers of variables, since a larger number of function evaluations is required due to the curse of dimensionality.

In the framework of prediction with expert advice, at each time step t the forecaster receives an instance from a fixed domain. The forecaster is given access to a set of p experts and is required to produce a distribution $w^t$ over such experts in each time step t. Each expert i then incurs a loss $\ell_i^t$, which contributes to the mixture loss of the forecaster given by $$\ell^t = \sum_i w_i^t \ell_i^t.$$

In general, there are no restrictions on the distribution of expert losses. The Hedge algorithm is perhaps the most popular approach to address this problem via an exponential weight update rule given by $w_i^t = w_i^{t-1} \exp(-\eta_t \ell_i^t)$, where $\eta$ is a learning rate.

The prediction with expert advice paradigm has been tailored to the problem of sparse online linear prediction from individual sequences. In particular, the $EG^\pm$ algorithm uses an exponential weight update rule to formulate an online linear regression algorithm which performs comparably to the best linear predictor under sparsity assumptions. The adaptive $EG^\pm$ algorithm further proposes a parameter-free version of $EG^\pm$ where the learning rate $\eta_t$ is updated in an adaptive fashion and is a decreasing function of time step t.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing system 110 connected to network 105. In an example embodiment, computing system 110 is representative of a computing device (e.g., one or more management servers) that operates to analyze information (e.g., for one or more organizations and users, etc.). In other embodiments, data processing environment 100 can include additional instances of computing devices (not shown) that can interface with computing system 110, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between computing system 110 and other computing devices, databases, etc. (not shown), in accordance with embodiments of the present invention. In various embodiments, network 105 facilitates communication among a plurality of networked computing devices (e.g., computing system 110, and other devices not shown), corresponding users (e.g., users associated with computing system 110, authorized users with devices that can access network 105, etc.), and corresponding management services.

In example embodiments, computing system 110 can be a desktop computer, a computer server, or any other computer systems, known in the art. In certain embodiments, computing system 110 represents computer systems utilizing clustered computers and components (e.g., database server computers, application server computers, etc.) that act as a single pool of seamless resources when accessed by elements of data processing environment 100 (e.g., via network 105, such as other devices not shown). In general, computing system 110 is representative of any electronic device or combination of electronic devices capable of executing computer readable program instructions. Computing system 110 may include components as depicted and described in further detail with respect to FIG. 6, in accordance with embodiments of the present invention.

Computing system 110 includes analysis program 200, acquisition function 112, surrogate model 114, and black box function 116. In various embodiments of the present invention, computing system 110 operates to optimize a black box function, such as black box function 116. In various embodiments, acquisition function 112, surrogate model 114, and black box function 116 are respectively representative of computer functions that execute corresponding operations and processes that are described in further detail below, in accordance with various embodiments of the present invention. In one embodiment, server 130 can host and store data associated with development and testing processes for one or more assets (e.g., in storage device 132). In additional embodiments, computing system 110 can access external data sources (not shown), via network 105, to assist in optimizing a black box function (i.e., executing analysis program 200), in accordance with various embodiments of the present invention.

In various embodiments, acquisition function 112 is a function designed to minimize $\hat{f}$, the current estimate, in a way that allows some exploration. To this end, embodiments of the present invention utilize a version of simulated annealing (SA) as the acquisition function that uses the offline evaluations of the surrogate model. SA consists of a discrete-time inhomogeneous Markov chain, and is used to address discrete optimization problems. In various aspects, further references of the acquisition function can reference acquisition function 112, in accordance with various embodiments of the present invention. More specific details and implementations of acquisition function 112 are described in further detail below, in accordance with various embodiments of the present invention.

In various embodiments, embodiments of the present invention utilize surrogate model 114 to approximate the black box function along with an acquisition function (e.g., to approximate black box function 116 along with acquisition function 112) applied to surrogate model 114. At each time step t, surrogate model 114 provides an estimate for the black box function using the observations $\{(x_i, f(x_i)): i \in [t]\}$ acquired so far. Having been equipped with the new estimate model, acquisition function 112 selects a new candidate point $x_t$ for evaluation. The black box function (e.g., black box function 116) then returns the evaluation $f(x_t)$ for the latter data point. The process is repeated until a stopping criterion, such as an evaluation budget or a time budget, is met. In various aspects, further references of the surrogate model can reference surrogate model 114, in accordance with various embodiments of the present invention. More specific details and implementations of surrogate model 114 are described in further detail below, in accordance with various embodiments of the present invention.

In various embodiments, black box function 116 is representative of a function (or system) that can be viewed in terms of the corresponding inputs and outputs. On example embodiments, black box function 116 can be representative of any form of relevant function, $f$, which computing system 110, utilizing analysis program 200, can evaluate and operate to optimize, in accordance with various embodiments of the present invention. In various aspects, further references of the black box function can reference black box function 116, in accordance with various embodiments of the present invention. More specific details and implementations of black box function 116 are described in further detail below, in accordance with various embodiments of the present invention.

In example embodiments, computing system 110 utilizes analysis program 200 for black box function optimization over the Boolean hypercube. Analysis program 200 utilizes the previously mentioned Combinatorial Optimization with Monomial Experts (COMEX) algorithm, which comprises a pool of monomial experts forming an approximate multi-linear polynomial representation for the black box function (e.g., black box function 116). At any time-step, the coefficients of the monomial experts are refreshed via an exponential weight update rule. In addition, analysis program 200 uses a version of simulated annealing applied to the current polynomial representation to produce new candidate points for black box function evaluations, in accordance with embodiments of the present invention. Analysis program 200 is described in further detail below, with regard to FIG. 2.

In various aspects of the description of embodiments of the present invention, sets are shown with calligraphic letters. For a set $\mathcal{C}$, $|\mathcal{C}|$ designates its cardinality. Matrices are indicated with uppercase letters; vectors and scalars are indicated with lowercase letters. Let $[n]=\{1, 2, \ldots, n\}$. For a matrix $A \in \mathbb{R}^{n \times m}$, $A_{i,j}$ designates the element in row i and column j. For a vector x, $x_i$ indicates its i-th entry. Let $\|x\|_p$ to denote the $\ell_p$ norm of a vector $x \in \mathbb{R}^n$, and denote the inner product by $\langle \cdot, \cdot \rangle$.

Embodiments of the present invention consider the problem of minimizing a black box function over the Boolean hypercube. The black box functions of interest are intrinsically expensive to evaluate, potentially noisy, and for which in general there is no trivial means to find the minimum. More precisely, given a subset $\mathcal{C}$ of the Boolean hypercube $X=\{-1, 1\}^d$, the objective is to find $$x^* = \mathrm{argmin}_{x \in \mathcal{C}} f(x)$$

where $f$ is a real-valued Boolean function $f(x): X \mapsto \mathbb{R}$.

Exhaustive search requires $|\mathcal{C}|$ function evaluations; however, since evaluating the black box function $f$ is expensive, embodiments of the present invention are interested in finding x* (or an approximation of it) in as few function evaluations as possible. In this problem, the performance of any algorithm is measured in terms of simple regret, which is the difference between the best evaluation seen until time t and the minimum function value $f(x^*)$:

$$R_t = \min_{i \in [t]} |f(x_i) - f(x^*)|. \qquad [L]$$

Two particularly important instances of such combinatorial structures are (i) unconstrained optimization problems where C includes the entire Boolean hypercube X where $|\mathcal{C}|=|X|=2^d$, and (ii) optimization problems with a sum constraint where $\mathcal{C}_n$ corresponds with the n-subsets of [d] such that $$\sum_i I(x_i = 1) = n,$$

where $I(\cdot)$ is the indicator function. In the latter problem, embodiments of the present invention have $$|\mathcal{C}_n| = \binom{d}{n}.$$

Embodiments of the present invention recognize that 'anytime' algorithms are particularly desirable for this problem for the following reasons: (1) in many applications the evaluation budget is not known in advance, and (2) the algorithm is run until certain stopping criteria are met. One such stopping criteria is the finite time budget, which is measured as the total computational time required for the algorithm to produce samples to be evaluated by the black box function, plus the evaluation time consumed by the black box function of interest.

In this work, embodiments of the present invention pursue the framework of using a surrogate model surrogate model (e.g., surrogate model 114) to approximate the black box function (e.g., black box function 116) along with an acquisition function (e.g., acquisition function 112) applied to the surrogate model. At each time step t, the surrogate model provides an estimate for the black box function using the observations $\{(x_i, f(x_i)): i \in [t]\}$ acquired so far. Having been equipped with the new estimate model, the acquisition function selects a new candidate point $x_t$ for evaluation. The black box function then returns the evaluation $f(x_t)$ for the latter data point. Embodiments of the present invention repeat the process is repeated until a stopping criterion, such as an evaluation budget or a time budget, is met.

Any real-valued Boolean function can be uniquely expressed by its multilinear polynomial representation:

$$f(x) = \sum_{\mathcal{J} \subseteq [d]} \alpha_{\mathcal{J}}^* \psi_{\mathcal{J}}(x)$$

which is referred to as the Fourier expansion of $f$, the real number $\alpha_{\mathcal{J}}^*$ is called the Fourier coefficient of $f$ on $\mathcal{J}$, and $\psi_{\mathcal{J}}(x) = \Pi_{i \in \mathcal{J}} x_i$ are monomials of order $|\mathcal{J}|$. The generality of Fourier expansions and the monomials' capability to capture interactions among different variables, make this representation particularly attractive for problems over the Boolean hypercube. In addition, in many applications of interest monomials of orders up to $m \ll d$ are sufficient to capture interactions among the variables, reducing the number of Fourier coefficients from $2^d$ to $$p = \sum_{i=0}^{m} \binom{d}{i},$$

which leads to the following approximate surrogate model for $f$:

$$\hat{f}_\alpha(x) = \sum_{i \in [p]} \alpha_i \psi_i(x).$$

Embodiments of the present invention employ the latter representation as the surrogate model (e.g., surrogate model 114) in our proposed algorithm (e.g., COMEX algorithm 300, depicted in FIG. 3) for execution utilizing analysis program 200, in accordance with various embodiments of the present invention.

Figure 2:
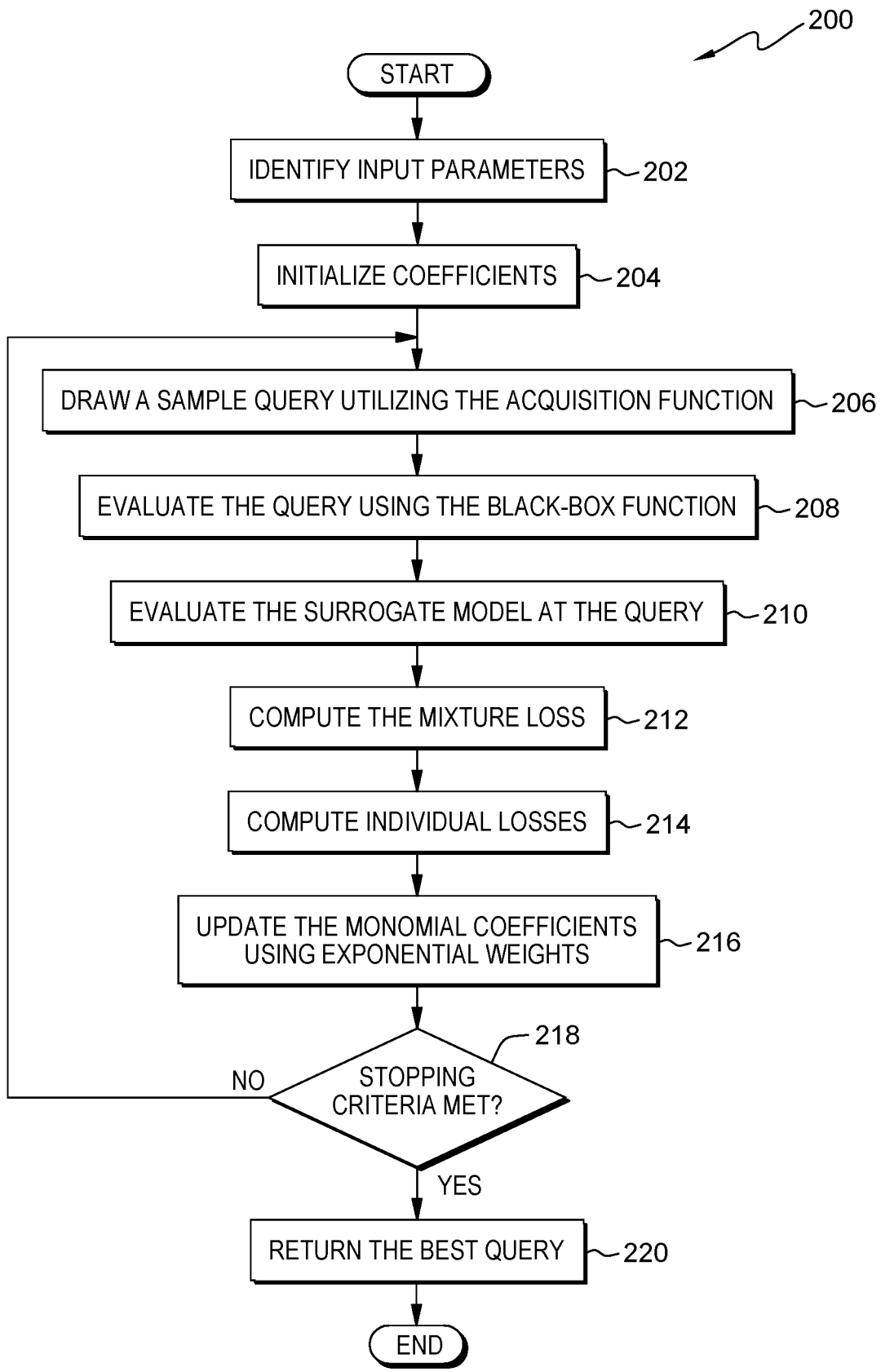
FIG. 2 is a flowchart depicting operational steps of a program for black box function optimization, in accordance with embodiments of the present invention.

FIG. 2 is a flowchart depicting operational steps of analysis program 200, a program for black box function optimization, in accordance with embodiments of the present invention. In various embodiments, computing system 110 executes analysis program 200 to perform black box function optimization over the Boolean hypercube. In example embodiments, analysis program 200 utilizes COMEX algorithm 300, which is depicted in further detail in FIG. 3. In example aspects, the following description of analysis program 200 references algorithmic functions that are depicted in further detail in COMEX algorithm 300 of FIG. 3.

Motivated by the properties of the hedge algorithm, embodiments of the present invention adopt an exponential weight update rule for the surrogate model. More precisely, embodiments of the present invention maintain a pool of monomials, where each monomial term plays the role of an expert. In particular, embodiments of the present invention operate to find the optimal Fourier coefficient $\alpha_i$ for the monomial expert $\psi_i$. Note that exponential weights are non-negative, while the Fourier coefficients could be either negative or positive. Following the same approach as sparse online linear regression literature, embodiments of the present invention maintain two non-negative coefficients for each Fourier coefficient $\alpha_i^t$ at time step t: $\alpha_{i,+}^t$ and $\alpha_{i,-}^t$. The value of the Fourier coefficient is then obtained via the subtraction $\alpha_i^t = (\alpha_{i,+}^t - \alpha_{i,-}^t)$.

In step 202, analysis program 200 identifies input parameters. In example embodiments, analysis program 200 identifies two input parameters, a sparsity parameter $\lambda$ and a maximum monomial order m. In step 204, analysis program 200 initializes coefficients. In example embodiments, analysis program 200 initializes the 2p coefficients $\alpha_{i,\gamma}$ of the representation with a uniform prior:

$$\forall \gamma \in \{-,+\} \text{ and } \forall i \in [p]: \alpha_{i,\gamma}^t = \frac{1}{2pt=0}$$

In step 206, analysis program 200 draws a sample query utilizing the acquisition function. In example embodiments, at each step t of COMEX algorithm 300, analysis program 200 draws a sample $x_t$ using acquisition function 112 (i.e., simulated annealing), with respect to the current estimate for the surrogate model $\hat{f}_{\alpha^t}$. An Example implementation of surrogate model 114 is previously described above. In example embodiments, analysis program 200 utilizes simulated annealing algorithm 400, which is depicted in further detail in FIG. 4.

In step 208, analysis program 200 evaluates the query using the black box function. In example embodiments, analysis program 200 plugs the query $x_t$ into the black box function $f$ (i.e., black box function 116). In addition, analysis program 200 evaluates the query $x_t$ and observes the corresponding evaluation of $f(x_t)$. In step 210, analysis program 200 evaluates the surrogate model at the query. In example embodiments, analysis program 200 evaluates the surrogate model (e.g., surrogate model 114) at the selected query $x_t$:

$$\hat{f}_{\alpha^t}(x) \leftarrow \sum_{i \in [p]} (\alpha_{i,+}^t - \alpha_{i,-}^t) \psi_i(x)$$

In step 212, analysis program 200 computes the mixture loss. In example embodiments, analysis program 200 computes the mixture loss $\ell^{t+1}$ as the difference between the evaluations obtained by the surrogate model and the black box function. For example, analysis program 200 computes mixture loss utilizing:

$$\ell^{t+1} \leftarrow \hat{f}_{\alpha^t}(x_t) - f(x_t)$$

In step 214, analysis program 200 computes individual losses. In example embodiments, analysis program 200 for any expert $\psi_i$, analysis program 200 computes the individual loss to update the coefficient with exponential weights. Analysis program 200 can then operate to normalize the coefficients. For example, analysis program 200 computes the individual losses accordingly:

$$\ell_i^{t+1} \leftarrow 2\lambda \ell^{t+1} \psi_i(x_t)$$

$$\alpha_{i,\gamma}^{t+1} \leftarrow \alpha_{i,\gamma}^t \exp(-\gamma \eta_t \ell_i^{t+1})$$

$$\alpha_{i,\gamma}^{t+1} \leftarrow \lambda \cdot \alpha_{i,\gamma}^{t+1} \Big/ \sum_{\mu \in \{-,+\}} \sum_{j \in [p]} \alpha_{j,\mu}^{t+1}$$

In step 216, analysis program 200 updates the monomial coefficients using exponential weights. In example embodiments, analysis program 200 updates the current estimate for the Fourier coefficients $\alpha^t$ via the exponential weight update rule, incorporating the incurred losses.

In decision step 218, analysis program 200 determines whether the stopping criteria is met. In example embodiments, analysis program 200 iterates until a stopping criteria is met. In response to determining that the stopping criteria is not met (decision step 218, NO branch), analysis program 200 returns to step 206.

In step 220, analysis program 200 returns the best query. More specifically, in response to determining that the stopping criteria is met (decision step 218, YES branch), analysis program 200 returns the best query $\hat{x}$ *, where:

$$\hat{x}^*, \mathrm{argmin}_{\{x_t: \forall i \in [t]\}} f(x_t)$$

An example implementation of analysis program 200 and COMEX algorithm 300 operates in the following way. Analysis program 200 operates to initialize the monomial coefficients $\alpha_{i,-}$ and $\alpha_{i,+}(\forall i \in [p])$ with a uniform prior. In each time step t, analysis program 200 produces a sample point $x_t$ via Simulated Annealing (SA) over a current estimate for the Fourier representation $\hat{f}_{\alpha^t}$ with Fourier coefficients $\alpha^t$. Analysis program 200 can then observe the black box function evaluation $f(x_t)$ for our query $x_t$, which leads to a mixture loss $\ell_t$ that is equal to the difference between the evaluations obtained by our estimate model and the black box function. The mixture loss, in turn, leads to the individual losses $\ell_i^t = 2\lambda \ell_t \psi_i(x_t)$ for the monomial experts $\psi_i : \forall i \in [p]$. Finally, analysis program 200 operates update the current estimate for the Fourier coefficients $\alpha^t$ via the exponential weight update rule, incorporating the incurred losses. Analysis program 200 can repeat the process until stopping criteria are met. Note that embodiments of the present invention utilize an anytime learning rate schedule of that includes a decreasing function of time t. A summary of an example of an algorithm that analysis program 200 can utilize is depicted in further detail as COMEX algorithm 300 in FIG. 3.

Further, as depicted and described with reference to FIG. 1 and FIG. 2, embodiments of the present invention provide a method for using a computing device to optimize a result for a combinatorial optimization problem. The computer-implemented method includes one or more processors receiving a black box model modeling multilinear polynomials. The computer-implemented method further includes one or more processors learning an optimized multilinear polynomial surrogate model employing an exponential weight update rule. The computer-implemented method further includes one or more processors applying the optimized learnt multilinear polynomial surrogate model to the black box model. The computer-implemented method further includes one or more processors performing, utilizing the black box model, an artificial intelligence function the black box model is designed to model.

In an additional aspect, the process of learning by the black box model includes one or more processors calculating a solution to a benchmark problem with less than all multilinear polynomials. Further, in example embodiments, the combinatorial optimization problem is related to machine learning, engineering economics, transport, healthcare, or natural sciences.

Consider the following theoretical insights. Let $D_{KL}(p\|q)$ denote the KL divergence between two distributions p and q, i.e.

$$D_{KL}(p\|q) = \sum_i p_i \log(p_i/q_i).$$

We can show that the KL-divergence between the estimate and true Fourier coefficients decreases over time, assuming that the true Fourier coefficients $\alpha^*$ are non-negative, and form a distribution, i.e.

$$\sum_i \alpha_i^* = 1.$$

Define $\phi_t = D_{KL}(\alpha^* \| \alpha^t)$ as the KL divergence between $\alpha^t$ and $\alpha^*$, where $\alpha^t$ are the estimates of Fourier coefficients at time t. With respect to COMEX algorithm 300, $\alpha_i^t = \alpha_{i,+}^t$ and $\alpha_{i,-}^t = 0$ in this case.

Lemma 1. The exponential weight update at any time step t for the Fourier coefficients $\alpha^t$, under the above stated assumption of non-negativity of the true Fourier coefficients $\alpha^*$, yields $$\phi_{t-1} \geq \phi_t + \eta 2\lambda \big(\hat{f}_{\alpha_t}(x_t) - f(x_t)\big)^2 - \eta^2 \text{ for } \eta < \frac{1}{8\lambda}.$$

Proof Using Lemma 4.1 of, for each exponential weight update at step t where $\alpha_i^t = \alpha_{i,+}^t$ and $\alpha_{i,-}^t = 0$, we have $$\phi_{t-1} \geq \phi_t \geq \eta \langle r^t, \alpha^{t-1} - \alpha^* \rangle - \eta^2 \; \left(\text{for } 0 < \eta < \frac{1}{8\lambda}\right),$$

where $r_t$ is the vector of individual losses, i.e. $r_i^t = \ell_i^t$. As a result, we only need to show that $\langle r^t, \alpha^{t-1} - \alpha^* \rangle$ is always greater than or equal to zero, since the value of $\eta$ can be chosen to be suitably small:

$$\langle r^t, \alpha^{t-1} - \alpha^* \rangle = \sum_i \ell_i^t (\alpha_i^{t-1} - \alpha_i^*)$$

$$= \sum_i 2\lambda \ell^t \psi_i(x_t)(\alpha_i^{t-1} - \alpha_i^*)$$

$$= 2\lambda \ell^t \sum_i (\alpha_i^{t-1} - \alpha_i^*)\psi_i(x_t)$$

$$= 2\lambda \left(\sum_i (\alpha_i^{t-1} - \alpha_i^*)\psi_i(x_t)\right)^2$$

$$= 2\lambda \big(\hat{f}_{\alpha_t}(x_t) - f(x_t)\big)^2 \geq 0.$$

This proves the Lemma.

Regarding the above Lemma, the above Lemma shows that for a small enough $\eta$, $\phi_{t-1} - \phi_t \geq 0$ for any evaluation point $x_t$. This shows that for a sufficiently small learning rate $\eta$, irrespective of the evaluation point $x_t$, there is a potential drop in the distance between the true and estimated coefficients after the exponential weight update at time t. This observation motivates our surrogate model and the deployment of the exponential weight update rule.

The results of Lemma 1 can be extended to the general case of Fourier coefficients with arbitrary signs, as follows. Lemma 1 holds for the general case of Fourier coefficients $\alpha_i^t$ with arbitrary signs.

Proof Following on the idea from, if $\|\alpha^*\|_1 \leq 1$, then one can always write $\alpha_i^* = \alpha_{i,+}^* - \alpha_{i,-}^*$ where $$\sum_{\gamma, i} \alpha_{i,\gamma}^* = 1$$

and $\alpha_{i,\gamma}^* \geq 0$. This is because any point inside an $\ell_1$ ball is in the convex hull of $\{e_i, -e_i\}_{i \in [d]}$ where $e_i$ are the canonical unit vectors. Therefore, to approximate it at any time t during the algorithm with exponential weight update, we assume that we have a set of 2p Fourier coefficients; we consider the monomial terms $+\psi_i(x)$ for the Fourier coefficients $\alpha_{i,+}^t$ as well as the monomial terms $-\psi_i(x)$ for the Fourier coefficients $\alpha_{i,-}^t$. Note that all the coefficients $\alpha_{i,\gamma}^t$, $\forall_\gamma \in \{-, +\}$ are non-negative, and that the set of all such coefficients form a distribution, i.e.

$$\sum_{i,\gamma} \alpha_{i,\gamma}^t = 1,$$

due to the normalization in COMEX algorithm 300. Therefore, applying Lemma 1 to the extended set of Fourier coefficients completes the proof.

In further aspects, acquisition function 112 is designed to minimize $\hat{f}$, the current estimate, in a way that allows some exploration. To this end, embodiments of the present invention employ a version of simulated annealing (SA) as the acquisition function that uses the offline evaluations of the surrogate model. SA consists of a discrete-time inhomogeneous Markov chain, and is used to address discrete optimization problems. The key feature of simulated annealing is that SA provides a means to escape local optima by allowing probabilistic hill-climbing moves in hopes of finding a global optimum. Although SA is not sample efficient in practice and is not suitable for optimization of black box functions (described in further detail later), SA can be set up in conjunction with a surrogate model.

Define the neighborhood model $\mathcal{N}$ for the unconstrained problem as:

$$\mathcal{N}(x_t) \leftarrow \{x_i : d_H(x_i, x_t) = 1 \text{ and } x_i \in \{0,1\}^d\},$$

where $d_H(x_i, x_t)$ designates the Hamming distance between $x_i$ and $x_t$. Also, embodiments of the present invention define the following neighborhood model for the sum-constrained problem:

$$\mathcal{N}(x_t) \leftarrow \{x_i : d_H(x_i, x_t) = 2 \text{ and } x_i \in \mathcal{C}_n\}.$$

Simulated annealing algorithm 400, which is depicted in further detail in FIG. 4, presents the simulated annealing for the latter two combinatorial structures, where s(t) is an annealing schedule, which is a non-increasing function of t. Embodiments of the present invention utilize an annealing schedule that follows an exponential decay given by $s(t) = \exp(-\omega t/d)$, where $\omega$ is a decay parameter.

Regarding analysis for an exponential acquisition function, embodiments of the present invention can utilize a simulated annealing-based acquisition function on the surrogate model $\hat{f}(x)$. This model is very difficult to analyze. Instead, we analyze an exponential acquisition function given by:

$$x \sim \frac{\exp(-\hat{f}_{\alpha_t}(x)/T)}{\sum_{k \in \{-1,1\}^d} \exp(-\hat{f}_{\alpha_t}(x)/T)}$$

where T is the temperature. Let the p.m.f of this acquired sample be $\hat{P}_{\alpha_t}(x)$. If we had access to the actual function $f$, we would use the acquisition function:

$$x \sim \frac{\exp(-f(x)/T)}{\sum_{k \in \{-1,1\}^d} \exp(-f(x)/T)}.$$

Let the p.m.f of this acquired sample be P(x). We emphasize that, given explicit access to $f$ (white-box), one would simply repeatedly acquire samples using the acquisition function for $f$. In our black box algorithm, we use the surrogate model to acquire samples.

Now, we show a result that implies the following under some additional technical condition: Until the acquisition function based on $\hat{f}_{\alpha_t}$ yields samples which are close in KL divergence to samples yielded by the acquisition function based on $f$, average $\phi_{t-1} - \phi_t$ (as in Lemma 1) is large.

In other words, if the acquisition function for the algorithm is far from the white-box acquisition function, then non-trivial learning of $f$ happens, i.e. $\alpha_t$ moves closer to $\alpha^*$ at least by a certain amount.

Let $$\hat{Z} = \sum_x \exp(-\hat{f}_{\alpha_t}(x)/T)$$

be the partition function. Similarly, let Z be the partition function associated with P(x).

Theorem 3.2. Let $-1 \leq \hat{f}_{\alpha_t}(x), f(x) \leq 1$. If at any time t, and for a temperature T, we have for some $\epsilon > 0$:

$$\left| D_{KL}(\hat{P}_{\alpha_t} \| P) - \log\left(\frac{Z}{\hat{Z}}\right) \right| \geq \epsilon,$$

then $$\mathbb{E}_{\hat{P}_{\alpha_t}}[\phi_{t-1} - \phi_t] \geq 2\eta\lambda\epsilon^2 T^2 - \eta^2.$$

Here, $D_{KL}$ is defined with respect to $\log_e$ for convenience. Remark 2. Note that the condition in the theorem definitely implies the condition that $D_{KL}(\hat{P}_{\alpha_t} \| P) > 0$.

Regarding computational complexity, the computational complexity per time step for model learning in the proposed algorithm is in $\mathcal{O}(p) = \mathcal{O}(d^m)$, which is linear in the number of Fourier coefficients. More importantly, the complexity of the proposed learning algorithm is independent of the number of function evaluations (i.e. time step t). Also noted is that the complexity of the simulated annealing is in $\mathcal{O}(d^2)$; therefore, the overall complexity of the algorithm remains $\mathcal{O}(p)$ for $m \geq 2$.

In the following description, relevant experimental results are described in further detail, to clearly articulate example advantages provided through embodiments of the present invention. In this section, we evaluate the performance of the proposed algorithm in terms of simple regret as well as average computational time required to draw a sample for each function evaluation. We consider four problems: two unconstrained combinatorial problems (Sparsification of Ising Models and Contamination Control) as well as two combinatorial optimization problems with a sum constraint (Noisy n-Queens and optimal defect pattern in 2D nanomaterials). The latter problem is adopted from a real-world scenario; it takes advantage of a genuine energy evaluator (as black box function) recognized in the molecular modeling literature, and has crucial real-life applications in designing nanomaterials utilized in nanoscale electronic devices.

We investigate the performance of different algorithms in two settings: (i) finite evaluation-budget regime, and (ii)

finite time-budget regime. In the former case, we assume that each algorithm is given a fixed evaluation budget and has access to an unlimited time budget. In this setting, we consider problems with a relatively small number of variables. In the latter case, we assume that each algorithm, in addition to an evaluation budget, has a limited time budget and reports the minimum obtained within that time frame. This scenario is particularly relevant in problems with moderate numbers of variables, since the computational cost for state-of-the art algorithms are prohibitive, which makes it impossible in practice to draw a large number of samples for function evaluation.

The results are compared against two baselines, random search (RS) and simulated annealing (SA), as well as two state-of-the-art algorithms, BOCS and COMBO. We use the BOCS-SA version of BOCS, as opposed to BOCS-SDP, since the former version is computationally less expensive; as such, its use would make more sense than BOCS-SDP in the finite time-budget setting. In addition, the BOCS-SA algorithm can be adapted to optimization problems with a sum constraint in a straightforward fashion.

All the results are averaged over 10 runs. We measure the performance of different algorithms in terms of the mean over simple regrets±one standard error of the mean. We run the experiments on machines from the Xeon E5-2600 v3 family. The function evaluations in all the experiments are linearly mapped from the original interval $[\min(f), \max(f)]$ to the target interval $[-1, 1]$. Hence, the function value of $-1$ corresponds with the desired minimum. In many cases, we know a lower bound on $\min(f)$ and an upper bound on $\max(f)$ that enables us to scale to $[-1, 1]$. In other cases where the lower bound on $\min(f)$ is unknown analytically, we fix a universal level which is smaller than all observed evaluations and compare all algorithms over all runs to this fixed level.

The sparsity parameter $\lambda$ of our proposed algorithm is set to 1 in all the experiments. In our experiments, the algorithm was relatively insensitive to the choice of this parameter. Note that BOCS and COMBO also include sparsity/regularization and exploration parameters for their respective algorithms, the choice of which did not seem to impact the outcome noticeably, in a similar fashion to our algorithm.

Finally, we note that COMBO is order agnostic, while our proposed algorithm as well as BOCS take the maximum monomial degree m as an input parameter. The maximum order m=2 or m=3 is deployed for our algorithm in the experiments. In particular, the sparsification of the Ising models as well as the contamination control problem have natural interactions of orders higher than two among the variables. As such, we set m=3 in the latter two problems. In the remaining experiments, a maximum order of m=2 is utilized. We set the maximum order of BOCS to 2 in all the experiments, due to its excessively high computational cost at m=3.

Sparsification of Ising Models

Let p be a zero-field Ising model with the probability distribution of $p(z)=1/Z_p \exp(z^T J^p z)$, where $z \in \{-1, 1\}^n$, $$Z_p = \sum_z \exp(z^T J^p z)$$

is the partition function, and $J^p \in \mathbb{R}^{n \times n}$ is a symmetric interaction matrix. The aim of the Ising sparsification problem is to find a sparse approximation model $q_x(z)=1/Z_q$ $\exp(z^T J^{q_x} z)$ such that $\forall i, j \in [n]: J_{i,j}^{q_x} = x_{i,j} J_{i,j}^p$, where $x_{i,j} \in \{0, 1\}$ are decision variables. The solution to this problem is given by:

$$x = \arg\min_{x \in \{0,1\}^d} D_{KL}(p\|q_x) + \lambda \|x\|_1$$

where $D_{KL}(p\|q_x)$ is the KL divergence of p and $q_x$, and $\lambda$ is a regularization parameter. The KL divergence is expensive to compute; in addition, an exhaustive search requires $2^d$ function evaluations, which is infeasible in general.

We follow an experimental setup where we have a 4×4 (n=16) Ising model with n=16 nodes and d=24 interactions. The values of the interactions are sampled uniformly at random from the interval [0.05, 5]. The proposed algorithm (e.g., COMEX algorithm 300) is able to hit the minimum found by both COMBO and BOCS, although it requires more function evaluations to achieve that feat. However, we point out that, as depicted in Table 1 (depicted in FIG. 5), the proposed algorithm only takes 0.1 seconds per time step on average as opposed to 47.7 and 78.4 seconds per time step taken for BOCS and COMBO, respectively. In particular, both BOCS and COMBO are computationally far more expensive than the black box function, whose average evaluation cost for each query is 2.24 seconds. Despite the poor initial performance, SA is also able to virtually reach the same minimum value as the latter three algorithms.

We note that the complexity of the Ising sparsification problem grows exponentially with d; hence, it is computationally infeasible to obtain black box evaluations for moderately large numbers of variables; hence, we only considered the finite evaluation-budget setting for this particular problem.

Contamination Control

The contamination control in food supply chain is an optimization problem with d binary variables representing stages that can be contaminated with pathogenic microorganisms. At each time step, one can intervene at each stage of the supply chain to reduce the contamination risk by a random rate (which follows a beta distribution) and incur an associated cost. The goal is to minimize the overall food contamination while minimizing the total prevention cost. As such, the minimization is carried out with respect to the set of decision variables $x \in \{0, 1\}^d$ incorporating an $\ell_1$ regularization term with a regularization parameter $\lambda$.

Following an experimental setting, we initially set d=21 and $\lambda$=0.01. In this example aspect, COMBO outperforms the rest of the algorithms in that it is able to find the minimum in just over 100 function evaluations on average. Despite its initially large regret results, BOCS is also able to find the minimum in just over 150 function evaluations. The proposed COMEX algorithm is also competitive and is able to find the minimum in just over 200 function evaluations. Note that SA and especially RS were not able to achieve the minimum in 250 function evaluations. Finally, we point out that the proposed algorithm takes a fraction of time required by BOCS and COMBO in order to draw evaluation samples, as shown in Table 1 (depicted in FIG. 5).

We then increase the dimensionality of the problem to d=100 variables. Due to the high dimensionality of this problem, drawing samples from both COMBO and BOCS becomes computationally expensive. Therefore, in addition to the evaluation budget of 1000, we set a finite time budget of 24 hours and run the experiments until at least one of the budget constraints is attained. In this setting, BOCS is only able to draw ≈150 samples, while COMBO exceeds the time budget at around 100 samples. On the other hand, the proposed algorithm is able to produce 1000 samples quickly and approach the minimum function value. Considering the high dimensionality of this data, RS produces poor results, whereas SA incurs an eventual simple regret of 0.2 on average. Finally, we note that COMEX is over 100 times faster than both BOCS and COMBO, as depicted (depicted in FIG. 5) in Table 1. Note that the average computation times reported in Table 1 correspond only with producing a point via the algorithm, whereas the 24-hour budget includes both the black box evaluation cost and the computation time of the algorithm.

Noisy N-Queens

We next consider a constrained optimization problem where the search space is restricted to the combinatorial domain $\mathcal{C}_n$. We adapt the acquisition function of different algorithms to this constrained domain in a straightforward manner. More specifically, we modify the local neighborhood search in both SA (in BOCS as well as in our proposed algorithm) and graph local search (in COMBO) to the constrained domain $\mathcal{C}_n$ by restricting the neighborhood to data points with Hamming distance of two rather than one, as defined in:

$$\mathcal{N}(x_t) \leftarrow \{x_i : d_H(x_i, x_t) = 2 \text{ and } x_i \in \mathcal{C}_n\}.$$

The n-queens problem is a commonly used benchmark in combinatorial optimization literature. The n-queens problem consists of finding the placement of n queens on an n×n chessboard so that no two queens share the same row, column, or diagonal. This problem can be formulated as a constrained binary optimization problem. We use binary variables $x_{ij}$ to represent the placement of a queen in each square position of the chessboard given by its row and column pair (i,j), for i,j∈[n]. A placement of queens is then represented by a binary vector x of length d=n×n. Hence, a solution to the n-queens problem simultaneously meets the following constraints:

There is exactly one queen in each row i∈[n]:

$$e_{rows}(x) = \sum_i \left(\sum_j x_{ij} - 1\right)^2 = 0,$$

There is exactly one queen in each column j∈[n]:

$$e_{cols}(x) = \sum_j \left(\sum_i x_{ij} - 1\right)^2 = 0,$$

There is at most one queen in each diagonal:

$$e_{diags}(x) = \sum_\ell \sum_{(i,j) \neq (k,h) \in \mathcal{D}_\ell} x_{ij} x_{kh} = 0,$$

where $\mathcal{D}_\ell$ represents the set of all the elements in the $\ell$-th diagonal, and the first summation is taken over all the diagonals with at least one square position.

The non-negative quadratic terms in the three above constraints indicate deviations from the required number of queens in each row, column, and diagonal, respectively. Thus, if there exists a solution to the n-queens problem given by a binary vector x satisfying all the constraints, the minimum of:

$$f(x) = e_{rows}(x) + e_{cols}(x) + e_{diags}(x)$$

must be achieved at zero, and vice versa. We know that for n>3 a solution to the n-queens problem indeed exists; therefore, minimizing $f(x)$ is equivalent to solving the three above constraints. This allows the formulation of the problem as an unconstrained optimization one.

To provide a benchmark for the constrained optimization case, we add the redundant constraint that $$\sum_i \sum_j x_{ij} = n$$

to our formulation when generating samples, effectively reducing the search space to $\mathcal{C}_n$. Thus, for each problem of size d, we have d=n×n binary variables to optimize over, where the search space is constrained to binary vectors with n ones. We consider a noisy version of this problem, where the function evaluations from Equation $f(x) = e_{rows}(x) + e_{cols}(x) + e_{diags}(x)$, having been linearly mapped to the interval [−1, 1], incur an additive Gaussian noise with zero mean and standard deviation of σ=0.02.

First, we consider a smaller version of this problem with n=7 and a finite evaluation budget of 250 samples. In this experiment, all the algorithms are able to exhaust the evaluation budget within the allocated 24-hour time frame. In this experiment, COMBO outperforms all the algorithms. BOCS performs only slightly better than RS. COMEX is a close second, while being able to run the experiment at a fraction of the time consumed by either COMBO or BOCS as indicated in Table 1 (depicted in FIG. 5).

Next, we increase the size of the problem to n=12 and enforce a finite time budget of 24 hours. In this case, COMBO and BOCS are unable to use the evaluation budget within the allotted time frame, and manage to draw only ≈100 and ≈150 samples, respectively. The proposed algorithm, on the other hand, is able to take advantage of the full evaluation budget and outperforms the baselines by a significant margin.

Figure 6:
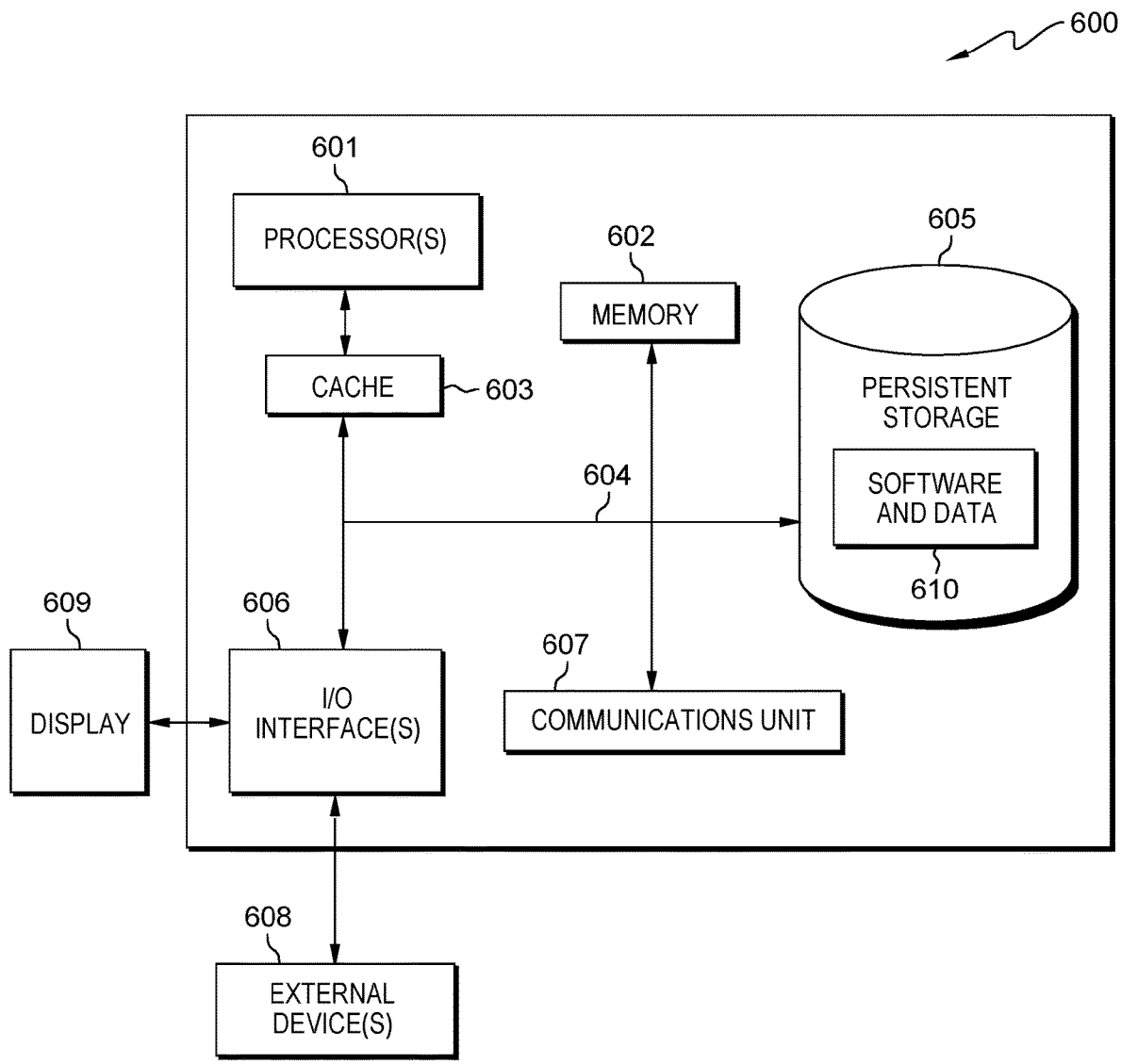
FIG. 6 depicts a block diagram of components of a computing system representative of the computing system of FIG. 1, in accordance with an embodiment of the present invention.

FIG. 6 depicts computer system 600, which is representative of computing system 110, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made. Computer system 600 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data (e.g., software and data 610) used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 610 can be stored in persistent storage 605 for access and/or execution by one or more of the respective processor(s) 601 via cache 603. With respect to computing system 110, software and data 610 includes analysis program 200, acquisition function 112, surrogate model 114, and black box function 116.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data (e.g., software and data 610) used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Program instructions and data (e.g., software and data 610) used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for optimizing a result for a combinatorial optimization problem, the method comprising:
    receiving, by one or more processors, a black box function modeling multilinear polynomials;
    learning, by one or more processors, a multilinear polynomial surrogate model;
    drawing a sample query utilizing an acquisition function;
    evaluating the sample query using the black box function to produce a black box function evaluation;
    evaluating the sample query using the multilinear polynomial surrogate model to produce a surrogate model evaluation;
    computing a mixture loss comprising a difference between the black box function evaluation and the surrogate model evaluation;
    calculating a plurality of individual losses based on the mixture loss;
    updating the multilinear polynomial surrogate model with the individual losses using an exponential weight update rule;
    responsive to determining that one or more stopping criteria have been met, returning the sample query.

2. The computer-implemented method of claim 1, wherein the multilinear polynomial surrogate model comprises a plurality of monomial experts.

3. The computer-implemented method of claim 1, wherein the combinatorial optimization problem is related to a field selected from the group consisting of:
    machine learning, engineering economics, transport, healthcare, or natural sciences.

4. The computer-implemented method of claim 1, wherein the acquisition function comprises a simulated annealing algorithm.

5. The computer-implemented method of claim 1, wherein a complexity of the method is independent of a number of function evaluations.

6. The computer-implemented method of claim 1, wherein the individual losses comprise individual losses for a plurality of monomial experts comprising the multilinear polynomial surrogate model.

7. The computer-implemented method of claim 1, wherein the stopping criteria comprise an evaluation budget or a time budget.

8. The computer-implemented method of claim 1, wherein the combinatorial optimization problem is represented by the black-box function over a Boolean domain.

9. A computer program product for optimizing a result for a combinatorial optimization problem comprising:
    one or more computer-readable tangible storage medium and program instructions stored on at least one of the one or more tangible storage medium, the program instructions executable by a processor to cause the processor to perform a method comprising:
    receiving, by one or more processors, a black box function modeling multilinear polynomials;
    learning, by one or more processors, a multilinear polynomial surrogate model;
    drawing a sample query utilizing an acquisition function;
    evaluating the sample query using the black box function to produce a black box function evaluation;

evaluating the sample query using the multilinear polynomial surrogate model to produce a surrogate model evaluation;

computing a mixture loss comprising a difference between the black box function evaluation and the surrogate model evaluation;

calculating a plurality of individual losses based on the mixture loss;

updating the multilinear polynomial surrogate model with the individual losses using an exponential weight update rule;

responsive to determining that one or more stopping criteria have been met, returning the sample query.

10. The computer program product of claim 9, wherein the multilinear polynomial surrogate model comprises a plurality of monomial experts.

11. The computer program product of claim 9, wherein the combinatorial optimization problem is related to a field selected from the group consisting of:

machine learning, engineering economics, transport, healthcare, or natural sciences.

12. The computer program product of claim 9, wherein the acquisition function comprises a simulated annealing algorithm.

13. The computer program product of claim 9, wherein a complexity of the method is independent of a number of function evaluations.

14. A computer system for optimizing a result for a combinatorial optimization problem, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving, by one or more processors, a black box function modeling multilinear polynomials;

learning, by one or more processors, a multilinear polynomial surrogate model;

drawing a sample query utilizing an acquisition function;

evaluating the sample query using the black box function to produce a black box function evaluation;

evaluating the sample query using the multilinear polynomial surrogate model to produce a surrogate model evaluation;

computing a mixture loss comprising a difference between the black box function evaluation and the surrogate model evaluation;

calculating a plurality of individual losses based on the mixture loss;

updating the multilinear polynomial surrogate model with the individual losses using an exponential weight update rule;

responsive to determining that one or more stopping criteria have been met, returning the sample query.

15. The computer system of claim 14, wherein the multilinear polynomial surrogate model comprises a plurality of monomial experts.

16. The computer system of claim 14, wherein the combinatorial optimization problem is related to a field selected from the group consisting of:

machine learning, engineering economics, transport, healthcare, or natural sciences.

17. The computer system of claim 14, wherein the acquisition function comprises a simulated annealing algorithm.

18. The computer system of claim 14, wherein a complexity of the method is independent of a number of function evaluations.

* * * * *